April 14, 1942.  E. A. CALAHAN  2,279,968
SERVER
Filed Jan. 31, 1941
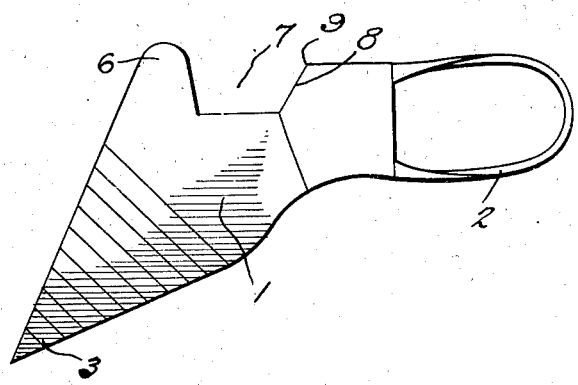
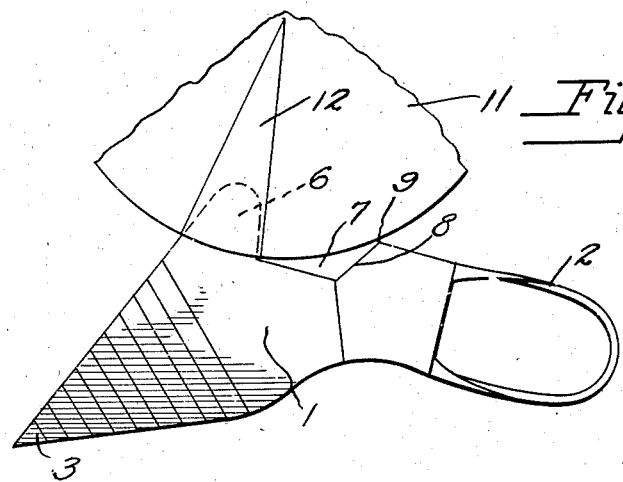
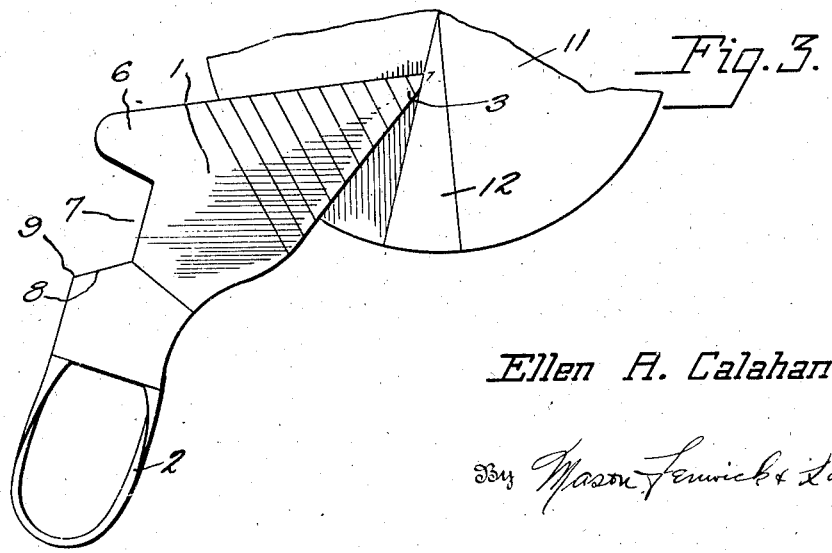
Inventor
Ellen A. Calahan
By Mason, Fenwick & Lawrence
Attorneys Patented Apr. 14, 1942

2,279,968

UNITED STATES PATENT OFFICE 2,279,968

SERVER

Ellen A. Calahan, Georgetown, Tex.

Application January 31, 1941, Serial No. 376,929

1 Claim. (Cl. 30—165)

This invention is concerned with an instrument to facilitate the serving of cake or similar pastry.

Many cakes are of texture so tender that slices break or tear as they are being detached from the body of the cake. Some cakes crumble readily, and others contain fillings or bear icings of insufficient body to withstand careless serving.

Properly to separate such cakes into suitable portions is difficult. Satisfactory preparation of slices is even more difficult when various individuals serve the cake or when the circumstances of a social function at which the cake is being dispensed tend to distract the attention of those entrusted with the serving. Separation of slices with neatness and dispatch is difficult, moreover, because various individuals often vary the type of slice between one cake and another. Some serve wedge-shaped and small slices, others wedge-shaped and large slices, and others narrow and rectangular. Sometimes at a public social event, great variety prevails even in one evening in the composition and texture and style of cake, as well as considerable difference in the type of slice being served and in the personnel of those charged with the care of serving the cake in its most attractive form.

A paramount object of this invention is to provide a server of such conformation as will facilitate dispensing cake of various sorts.

A particular object also is to provide a cake server that is especially useful for small slices, but also is adequate to serve large sections of cake.

A further object is to provide an instrument that will detach slices readily and will minimize breakage of tender cake, especially at the line of contact with the container upon which the cake may rest.

These objects and others will appear in the following illustrative description of this invention, as depicted in the accompanying drawing and more fully defined in the appended claim.

In the drawing, which pertains to an illustrative embodiment of this invention:

Figure 1 shows a top view of this server;

Figure 2 shows a preferred disposition of this server with respect to a slice of cake of relatively small size; and Figure 3 illustrates an application of this server to the detachment of the outer edge of a slice of cake from its underlying support.

Under this invention a cake server of valuable qualities is prepared by arranging a substantial tongue along one edge, for example on the right hand edge of a right hand server. Preferably the tongue extends generally parallel to the edge of the server. Further advantages are obtained by placing adjacent this tongue a recess of considerable width, commensurate with the width of a small slice of cake. In depth the recess preferably is commensurate with the tongue. Further improvement lies in providing a handle portion of the server at an obtuse angle to the tongue.

This invention will be illustrated by description referring more particularly to the specific form shown in the accompanying drawing, though the invention may be practiced by others than this specific form.

In the drawing is shown a server having a generally triangular blade or body portion 1 disposed at an obtuse angle to a handle portion 2. The blade includes a wedge-shaped tip portion 3 near the point. The tip of the server and the body of the blade readily support either a cake slice of medium width or one of large size.

The front portion of the server extends in a smooth edge and terminates as a tongue 6 defined by a recess 7.

The tongue 6 is curved in a blunt rounded end and is of sufficient length to be extended under an appreciable portion of a small slice of cake. The width of the tongue across its base should be sufficient to support a substantial portion of a small slice of cake.

This invention may be illustrated further by reference to typical uses of the server thus described. In use, one of the advantageous applications of this tongue 6 is to loosen or raise a small slice of cake at its base. Thus, the tongue 6 may be pushed under an outer edge of a cake 11 to a supporting position under a slice 12 to be removed. The blunt end of tongue 6 may be placed at the outer edge of the cake, near the cut between the small slice to be removed and body of the cake. The handle thus lies a considerable distance away from the cake because of the obtuse angle between the handle and the edge of the tongue.

Another application of this server also will illustrate the way in which the server minimizes tearing of a slice. For a large slice of cake the main body of the blade will be useful. This body may be inserted under a slice of cake starting with the tip 3 approaching the slice from the side and at the bottom as shown in Figure 3. This initial approach to a slice is facilitated by the obtuse angle that the handle 2 forms with the blade 3. The handle 2 lies near the user even though the tip of the blade approaches the slice at a considerable angle.

By reason of the structure defined and illustrated, the main blade 1 and auxiliary tongue 6 are both made of the greatest practical area in a very compact tool, the tongue 6 being arranged to function as part of blade 1 when desired in connection with very large slices and independently thereof in connection with smaller slices, but in each case without interference one with the other, the handle being conveniently positioned with respect to each.

What I claim is:

A cake server comprising a wedge-shaped blade adapted to support a slice of cake, with a handle projecting from one side of the base of the blade at an obtuse angle, the other side of the base and adjacent handle being notched to define a tongue having one of its sides a continuation of the side of the blade.

ELLEN A. CALAHAN.